United States Patent
Nakano et al.

(10) Patent No.: US 7,715,338 B2
(45) Date of Patent: May 11, 2010

(54) COMMUNICATION SYSTEM

(75) Inventors: Tadashi Nakano, Fukuoka (JP);
Nobuhiko Eguchi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 760 days.

(21) Appl. No.: 11/525,877

(22) Filed: Sep. 25, 2006

(65) Prior Publication Data

US 2007/0217337 A1 Sep. 20, 2007

(30) Foreign Application Priority Data

Mar. 14, 2006 (JP) ............................. 2006-068459

(51) Int. Cl.
*H04B 7/204* (2006.01)
(52) U.S. Cl. ..................... 370/325; 370/218; 370/282; 370/360; 370/408
(58) Field of Classification Search ................ 370/323, 370/360, 389, 398, 395.54, 282, 325, 218, 370/408
See application file for complete search history.

(56) References Cited

U.S. PATENT DOCUMENTS

| | | | | |
|---|---|---|---|---|
| 5,708,654 A * | 1/1998 | Arndt et al. | ................. | 370/242 |
| 6,477,489 B1 * | 11/2002 | Lockwood et al. | ....... | 704/200.1 |
| 6,640,314 B1 * | 10/2003 | Lelaure et al. | ................. | 714/11 |
| 6,947,410 B1 * | 9/2005 | Schwartz et al. | ............ | 370/352 |
| 7,088,689 B2 * | 8/2006 | Lee et al. | ..................... | 370/282 |
| 2004/0199627 A1 * | 10/2004 | Frietsch | ....................... | 709/224 |
| 2007/0070998 A1 * | 3/2007 | Sethuram et al. | ............ | 370/389 |
| 2007/0091911 A1 * | 4/2007 | Watanabe et al. | ........... | 370/408 |

FOREIGN PATENT DOCUMENTS

JP          11-027310 A          1/1999

* cited by examiner

*Primary Examiner*—Ricky Ngo
*Assistant Examiner*—Dewanda Samuel
(74) *Attorney, Agent, or Firm*—Hanify & King PC

(57) ABSTRACT

In a communication system including an external maintenance terminal and a communication device in which boards including a maintenance-and-operation board and a switchboard are installed, the switchboard is directly connected to the external maintenance terminal, and a predetermined address is assigned for use only in communication between the maintenance-and-operation board and the external maintenance terminal, and set in the switchboard. When communication is performed between ones of the boards, the switchboard connects the ones of the boards on the basis of the local addresses of the ones of the boards. When communication is performed between the maintenance-and-operation board and the external maintenance terminal, the switchboard connects the maintenance-and-operation board to the external maintenance terminal, and translates a global address of the external maintenance terminal into the predetermined address and vice versa.

10 Claims, 13 Drawing Sheets

COMMUNICATION SYSTEM

CROSS-REFERENCE TO RELATED APPLICATIONS

This application is based on and claims the benefits of priority from the prior Japanese Patent Application No. 2006-068459, filed on Mar. 14, 2006, the contents of which are incorporated herein by reference.

BACKGROUND OF THE INVENTION

1. Field of the Invention

The present invention relates to a communication system which performs communication by use of the Internet protocol (IP).

2. Description of the Related Art

In recent years, the IP-based communications have been performed in many of the communication systems including the exchange systems and the mobile communication systems, and have been becoming more important. In the systems having the function of IP communication, it is necessary to perform operations for maintenance such as status monitoring and operational settings.

FIG. 13 is a schematic diagram illustrating an outline of a conventional IP communication system. The IP communication system 5 illustrated in FIG. 13 is constituted by an IP communication device 50 and an external maintenance terminal 50a, and the IP communication device 50 comprises a maintenance-and-operation board 51, a LAN (Local Area Network) switchboard 52, an external-LAN-interface board 53, and communication-processing boards 54-1 to 54-n.

The external-LAN-interface board 53 is an interface board arranged for connecting the IP communication device 50 to the external maintenance terminal 50a. The LAN (Local Area Network) switchboard 52 is a board arranged for switching connections between the above boards in the IP communication device 50. The maintenance-and-operation board 51 is a board arranged for performing maintenance and controlling operations of the IP communication device 50 by performing communication with the external maintenance terminal 50a. The communication-processing boards 54-1 to 54-n are boards arranged for performing various processing functions, e.g., call processing functions, and functions of a communication interface with other systems. The external maintenance terminal 50a is provided for an operator performing operations for maintenance such as status monitoring and operational settings.

Normally, the external maintenance terminal 50a is a communication device having a global address, and the IP communication device 50 is a device constituted by a plurality of boards each having a local address. Specifically, a global MAC (Media Access Control) address is assigned to the external maintenance terminal 50a, and a local MAC address is assigned to each of the boards (including the maintenance-and-operation board 51) in the IP communication device 50.

The global MAC address is a uniquely assigned public address, and the local MAC addresses are addresses assigned by a user. For example, the local MAC addresses are assigned on the basis of the installation positions of the slots or shelves.

Therefore, the address system of the IP communication device 50a is different from the address system of the boards in the IP communication device 50, so that the global MAC address of the external maintenance terminal 50a cannot be used in the IP communication device 50, and the external maintenance terminal 50a cannot be connected to (cannot communicate with) the IP communication device 50.

In conventional IP communication devices, a dedicated board having a function of translating a global MAC address into a local MAC address, and a local MAC address into a global MAC address is provided for the purpose of solving the above problem. Specifically, in the conventional IP communication system 5 of FIG. 13, the external-LAN-interface board 53 is provided for the above purpose.

Thus, when the external maintenance terminal 50a is connected to the maintenance-and-operation board 51 in the IP communication device 50 for communication with the maintenance-and-operation board 51, address translation is performed under software control of a CPU in the external-LAN-interface board 53 so that IP communication between the external maintenance terminal 50a (which is a global and external terminal) and the maintenance-and-operation board 51 (which is a local device in the IP communication device 50) is realized through the external-LAN-interface board 53.

For example, Japanese Unexamined Patent Publication No. 11-27310 (in Paragraph Nos. 0018 to 0028 and FIG. 1) discloses a conventional IP communication technique in which a global MAC address is translated into a local MAC address and a local MAC address is translated into a global MAC address.

However, the conventional IP communication system 5 has the following problems (1) to (4).

(1) When the external-LAN-interface board 53 fails, the connection between the external maintenance terminal 50a and the maintenance-and-operation board 51 is disconnected, so that it is impossible to send information on the failure in the system to the external maintenance terminal 50a until the external-LAN-interface board 53 recovers from the failure.

(2) The external-LAN-interface board 53 is fixedly interposed between the external maintenance terminal 50a and a board in the maintenance-and-operation board 51, and communication is performed under software control of the CPU in the external-LAN-interface board 53. Therefore, it takes substantial time to transfer massive files and collect log data indicating system failures, so that it is impossible to quickly perform maintenance.

(3) When massive data is transmitted between the external maintenance terminal 50a and the maintenance-and-operation board 51, the processing load imposed on the CPU in the external-LAN-interface board 53 increases, and excessive usage of the CPU can cause disconnection in the communication with the external maintenance terminal 50a.

(4) Since provision of a dedicated board such as the external-LAN-interface board 53 is required for connection with the external maintenance terminal 50a, the equipment cost increases.

SUMMARY OF THE INVENTION

The present invention is made in view of the above problems, and the object of the present invention is to provide a communication system in which a plurality of devices using different address systems can be easily connected so that communication can be performed between such devices without use of a dedicated board for address translation.

In order to accomplish the above object, according to the present invention, a communication system is provided. The communication system comprises: an external maintenance terminal to which a global address is assigned, and which externally performs operations for maintenance of a communication device; and the communication device in which a plurality of boards including a maintenance-and-operation board and a switchboard are installed. In the communication system, local addresses which are uniquely defined in the communication device are assigned to the plurality of boards, respectively, the first switchboard is directly connected to the external maintenance terminal, the maintenance-and-operation board performs operations for maintenance and control of the communication device by performing communication with the external maintenance terminal, and a predetermined address is assigned for use only in communication between the maintenance-and-operation board and the external maintenance terminal, and set in the switchboard. In addition, when communication is performed between ones of the plurality of boards, the switchboard establishes a first connection between the ones of the plurality of boards on the basis of ones of the local addresses assigned to the ones of the plurality of boards. Further, when communication is performed between the maintenance-and-operation board and the external maintenance terminal, the switchboard establishes a second connection between the maintenance-and-operation board and the external maintenance terminal, and translates the global address into the predetermined address, and the predetermined address into the global address.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Preferred embodiments of the present invention will be explained below with reference to the accompanying drawings, wherein like reference numbers refer to like elements throughout.

Basic Construction

Figure 1:
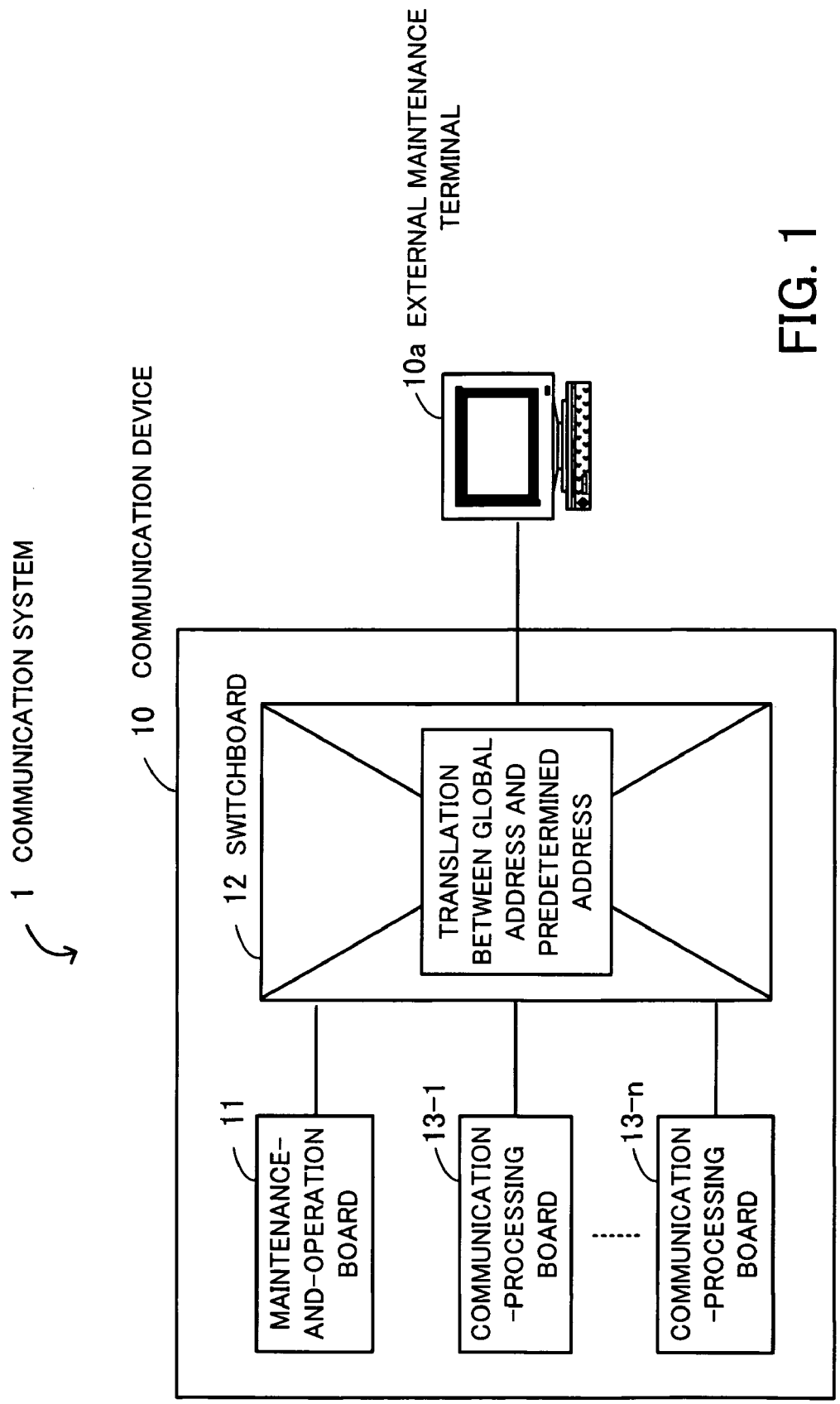
FIG. 1 is a diagram illustrating the basic construction of the communication system according to the present invention.

FIG. 1 is a diagram illustrating the basic construction of the communication system according to the present invention. The communication system of FIG. 1 is constituted by a communication device 10 and an external maintenance terminal 10a. The external maintenance terminal 10a is provided for externally performing operations for maintenance of the objective device (i.e., the communication device 10), and a global address is assigned to the external maintenance terminal 10a.

A plurality of boards are installed in the communication device 10, and local addresses are assigned to the boards in the communication device 10, where the local addresses are unique in the communication device 10. The plurality of boards include a maintenance-and-operation board 11, a switchboard 12, and communication-processing boards 13-1 to 13-n. That is, local addresses, which are unique in the communication device 10, are assigned to the maintenance-and-operation board 11, the switchboard 12, and the communication-processing boards 13-1 to 13-n.

The maintenance-and-operation board 11 performs operations for maintenance and control of the communication device 10 by performing communication with the external maintenance terminal 10a.

The switchboard 12 establishes a connection between ones of the boards in the communication device 10 on the basis of the local addresses of the ones of the boards when communication is performed between the ones of the boards. The ones of the boards may be ones of the communication-processing boards 13-1 to 13-n, or the maintenance-and-operation board 11 and one of the communication-processing boards 13-1 to 13-n.

For example, when communication is performed between the communication-processing boards 13-1 and 13-n, the switchboard 12 connects the communication-processing boards 13-1 and 13-n. When communication is performed between the maintenance-and-operation board 11 and the communication-processing board 13-1, the switchboard 12 connects the maintenance-and-operation board 11 and the communication-processing board 13-1.

When communication is performed between the external maintenance terminal 10a and the maintenance-and-operation board 11, the switchboard 12 is directly connected to the external maintenance terminal 10a, and connects the maintenance-and-operation board 11 and the external maintenance terminal 10a. At this time, the global address assigned to the external maintenance terminal 10a and the local address assigned to the maintenance-and-operation board 11 belong to different address systems. Therefore, in order to realize communication between the maintenance-and-operation board 11 and the external maintenance terminal 10a, a predetermined address which is used only when the external maintenance terminal 10a is connected is set in the switchboard 12 in advance. The communication between the external maintenance terminal 10a and the maintenance-and-operation board 11 is enabled by translation between the global address of the external maintenance terminal 10a and the predetermined address. Hereinafter, the translation between the global address of the external maintenance terminal 10a and the predetermined address is referred to as virtual routing.

Construction of First Embodiment

Figure 2:
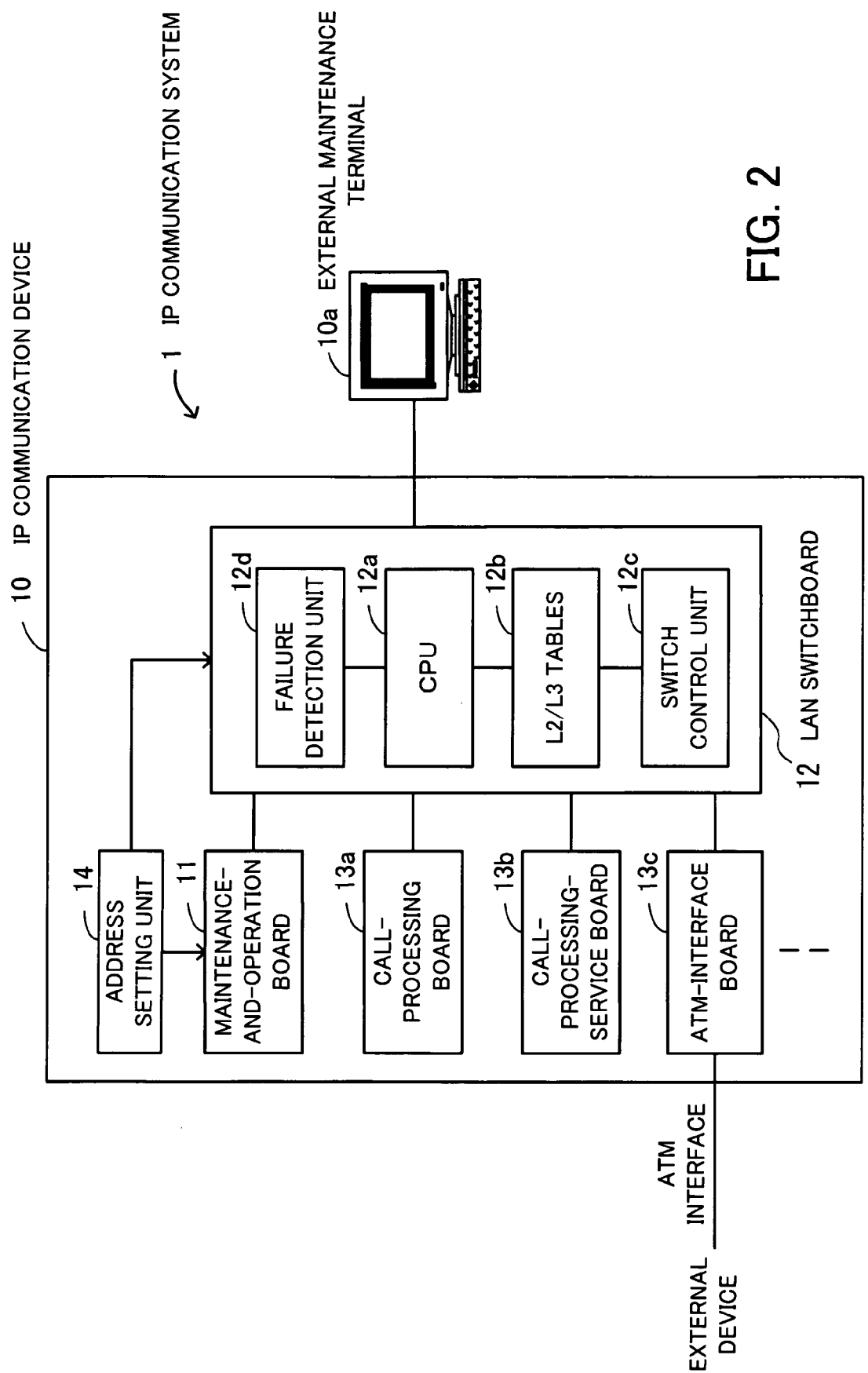
FIG. 2 is a diagram illustrating a configuration of an IP communication system according to a first embodiment of the present invention.

Hereinbelow, details of a construction and operations of a communication system according to the first embodiment of the present invention are explained. FIG. 2 shows a configuration of an IP communication system as the first embodiment of the communication system according to the present invention. As illustrated in FIG. 2, the IP communication system 1 is constituted by a communication device 10 (which is hereinafter referred to as the IP communication device 10) and an external maintenance terminal 10a, which is remotely located.

The IP communication device 10 comprises a maintenance-and-operation board 11, a switchboard 12 (which may be hereinafter referred to as a LAN switchboard 12), a call-processing board 13a, a call-processing-service board 13b, an ATM-interface board 13c, an address setting unit 14, and other boards, where LAN stands for local area network, and ATM stands for asynchronous transfer mode. In the IP communication device 10, local IP communication is performed by transfer of Ethernet frames between the above boards, where Ethernet is a registered trademark of Xerox Corporation.

The external maintenance terminal 10a is directly connected to the LAN switchboard 12 in the IP communication device 10, and performs operations for maintenance and control of the IP communication device 10 by performing communication with the maintenance-and-operation board 11 through the LAN switchboard 12. For example, the external maintenance terminal 10a sends to the maintenance-and-operation board 11 a command which is set by a user, and displays on a screen the status of the IP communication device 10 monitored by the maintenance-and-operation board 11.

An application for performing communication with the external maintenance terminal 10a is installed in the maintenance-and-operation board 11 so that the maintenance-and-operation board 11 has the functions of setting in the IP communication device 10 a command sent from the external maintenance terminal 10a, and sending the operational status of the IP communication device 10 to the external maintenance terminal 10a. In addition, the maintenance-and-operation board 11 detects a failure of each board, and performs processing for restarting a board when the board recovers from a failure.

The LAN switchboard 12 comprises a CPU 12a, L2/L3 tables 12b, a switch control unit 12c, and a failure detection unit 12d. The CPU 12a sets address information necessary for establishment of connections in the LAN switchboard 12, in the L2/L3 tables 12b by software control when the IP communication device 10 is initialized. The L2/L3 tables 12b store the address information for use in address translation, which is explained later with reference to FIGS. 5 and 6.

The switch control unit 12c establishes a connection by hardware control on the basis of the address information which is set in the L2/L3 tables 12b. That is, all communications between the boards in the IP communication device 10 and between the maintenance-and-operation board 11 and the external maintenance terminal 10a are performed through the switch control unit 12c in the LAN switchboard 12, and the switching in the switch control unit 12c is controlled by hardware. Specifically, when the switch control unit 12c receives an Ethernet frame sent from a board, the switch control unit 12c transfers the Ethernet frame to a destination port to which the destination of the Ethernet frame is connected, on the basis of the destination MAC address in the received Ethernet frame. The failure detection unit 12d detects a failure in the software control by the CPU 12a. Details of the operation of the failure detection unit 12d are explained later with reference to FIG. 9.

The call-processing board 13a is a board for controlling call processing, and the call-processing-service board 13b is a board for providing a service for each call. The ATM-interface board 13c performs interface processing for connecting the IP communication device 10 with an ATM communication system. For example, an external device (e.g., a node B (base station) in a mobile communication system) connected to the ATM-interface board 13c can communicate with the external maintenance terminal 10a.

When the IP communication device 10 is initialized, the address setting unit 14 sends to the maintenance-and-operation board 11 and the LAN switchboard 12 address information necessary for establishment of a connection between the maintenance-and-operation board 11 and the external maintenance terminal 10a. At this time, the address information sent to the maintenance-and-operation board 11 includes a global address to be set in the maintenance-and-operation board 11, and the address information sent to the LAN switchboard 12 includes global addresses to be set in the LAN switchboard 12 and a predetermined address which is used only when the external maintenance terminal 10a is connected. The above operation of the address setting unit 14 is explained in detail later with reference to FIG. 7. The address setting unit 14 may be a database arranged in the IP communication device 10, and particularly in a board (e.g., the maintenance-and-operation board 11).

Transfer of Frames

Figure 3:
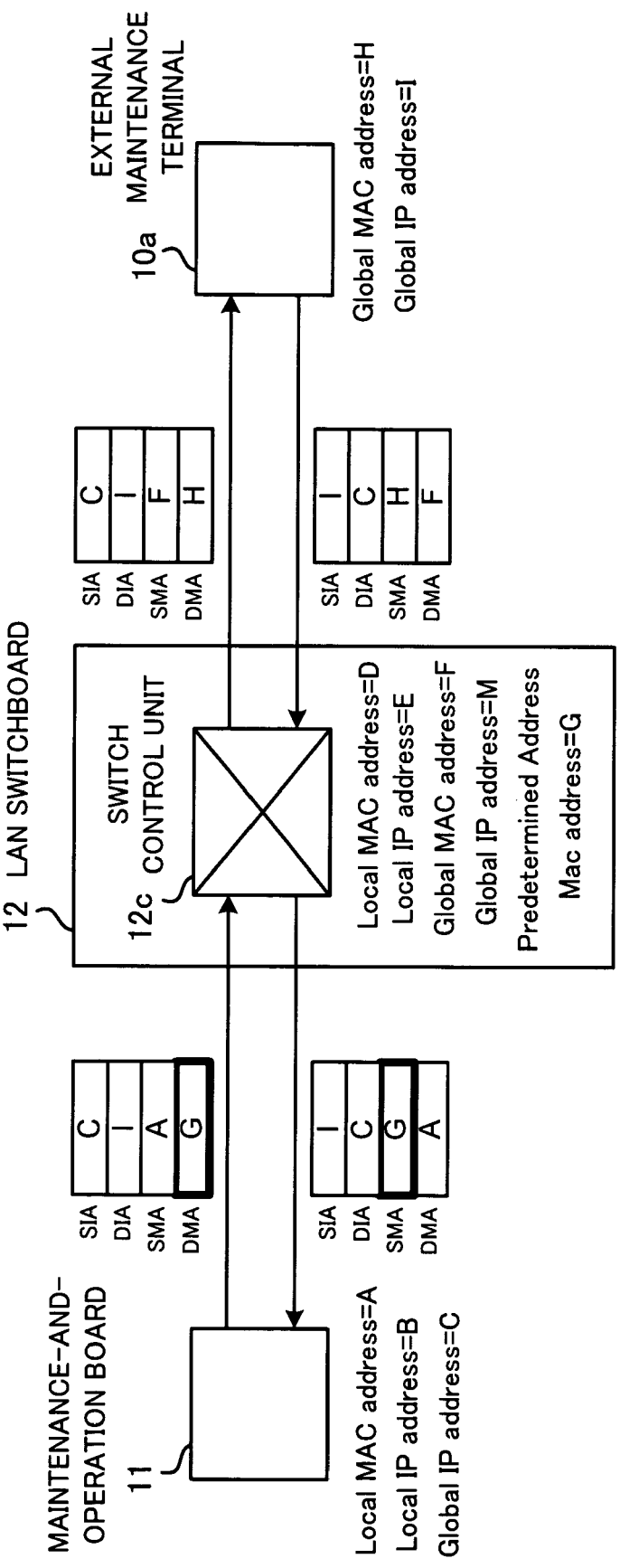
FIG. 3 is a diagram illustrating examples of transfer of Ethernet frames between an external maintenance terminal and a maintenance-and-operation board in the IP communication system of FIG. 2.

Next, transfer of Ethernet frames between the external maintenance terminal 10a and the maintenance-and-operation board 11 is explained below. FIG. 3 is a diagram illustrating examples of transfer of Ethernet frames between the external maintenance terminal 10a and the maintenance-and-operation board 11 in the IP communication system 10 of FIG. 2. In FIG. 3, DMA stands for destination MAC address, SMA stands for source MAC address, DIA stands for destination IP address, and SIA stands for source IP address.

As indicated in FIG. 3, it is assumed that the global MAC address "H" and the global IP address "I" are assigned to the external maintenance terminal 10a, the local MAC address "A," the local IP address "B," and the global IP address "C" are assigned to the maintenance-and-operation board 11, and the local MAC address "D," the local IP address "E," the global MAC address "F," and the global IP address "M" are assigned to the LAN switchboard 12, although not all of the above addresses are used in the transfer of Ethernet frames between the external maintenance terminal 10a and the maintenance-and-operation board 11. In addition, the local MAC address "G" is set as the predetermined address which is used only when the external maintenance terminal 10a is connected to the maintenance-and-operation board 11. The above global addresses of the maintenance-and-operation board 11 and the LAN switchboard 12 and the predetermined address are supplied by the address setting unit 14 and set in the maintenance-and-operation board 11 and the LAN switchboard 12 when the IP communication device 10 is initialized (as explained later with reference to FIG. 7).

First, transfer of a frame from the external maintenance terminal 10a to the maintenance-and-operation board 11 is explained below.

As indicated in FIG. 3, in the Ethernet frame transmitted from the external maintenance terminal 10a to the LAN switchboard 12 (which is referred to as the first frame), the global MAC address "F" of the LAN switchboard 12 is set as the destination MAC address (DMA), the global MAC address "H" of the external maintenance terminal 10a is set as the source MAC address (SMA), the global IP address "C" of the maintenance-and-operation board 11 is set as the destination IP address (DIA), and the global IP address "I" of the external maintenance terminal 10a is set as the source IP address (SIA).

The above first frame is directly terminated at the LAN switchboard 12. In the LAN switchboard 12, the destination MAC address (DMA) is translated into the local MAC address "A" of the maintenance-and-operation board 11, and the source MAC address (SMA) is translated into the MAC address "G" (which is set as the predetermined address in the LAN switchboard 12) by virtual routing processing (i.e., the processing for translation between the global address and the predetermined address). That is, the global MAC address "H" of the external maintenance terminal 10a in the first frame is translated into the local MAC address "G" as the predetermined address. At this time, the destination IP address (DIA) and the source IP address (SIA) are not changed. Thus, an Ethernet frame containing the address translated as above (which is referred to as the second frame) is generated and transferred to the maintenance-and-operation board 11.

The above operations for switch control (including the above address translation) are performed in the LAN switchboard 12 by use of the L2/L3 tables 12b, and the second frame is outputted from a port which is associated with the destination MAC address (DMA) in the L3 table (i.e., the LAN port connected to the maintenance-and-operation board 11).

Next, transfer of a frame from the maintenance-and-operation board 11 to the external maintenance terminal 10a is explained below.

As indicated in FIG. 3, in the Ethernet frame transmitted from the maintenance-and-operation board 11 to the LAN switchboard 12 (which is referred to as the third frame), the MAC address "G" (which is set as the predetermined address in the LAN switchboard 12) is set as the destination MAC address (DMA), the local MAC address "A" of the maintenance-and-operation board 11 is set as the source MAC address (SMA), the global IP address "I" of the external maintenance terminal 10a is set as the destination IP address (DIA), and the global IP address "C" of the maintenance-and-operation board 11 is set as the source IP address (SIA).

The above third frame is sent to the LAN switchboard 12. In the LAN switchboard 12, the MAC address "G" (which is set as the destination MAC address (DMA) in the third frame) is translated into the global MAC address "H" of the external maintenance terminal 10a by virtual routing processing, and the local MAC address "A" of the maintenance-and-operation board 11 (which is set as the source MAC address (SMA) in the third frame) is translated into the global MAC address "F" of the LAN switchboard 12. At this time, the destination IP address (DIA) and the source IP address (SIA) are not changed. Thus, an Ethernet frame containing the address translated as above (which is referred to as the fourth frame) is generated and transferred to the external maintenance terminal 10a.

The above operations for switch control (including the above address translation) are performed in the LAN switchboard 12 by use of the L2/L3 tables 12b, and the fourth frame is outputted from a port which is associated with the destination MAC address (DMA) in the L3 table (i.e., the LAN port connected to the external maintenance terminal 10a).

In addition, the above switching operations (including the translation of the MAC addresses) are performed in the switch control unit 12c in the LAN switchboard 12 by hardware control.

Figure 4:
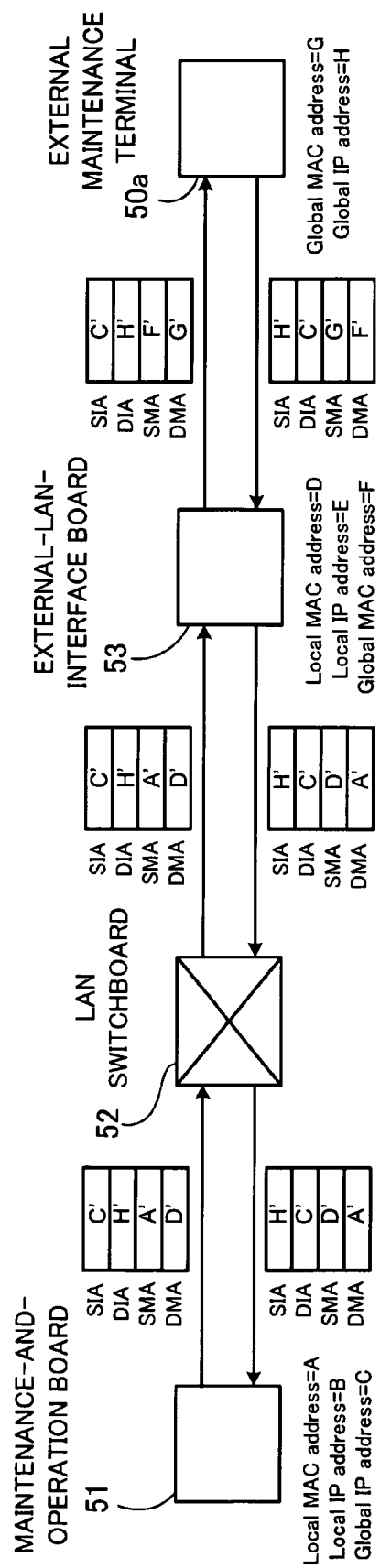
FIG. 4 is a diagram illustrating examples of transfer of frames between an external maintenance terminal and a maintenance-and-operation board in a conventional communication system having an external-LAN-interface board.
Figure 13:
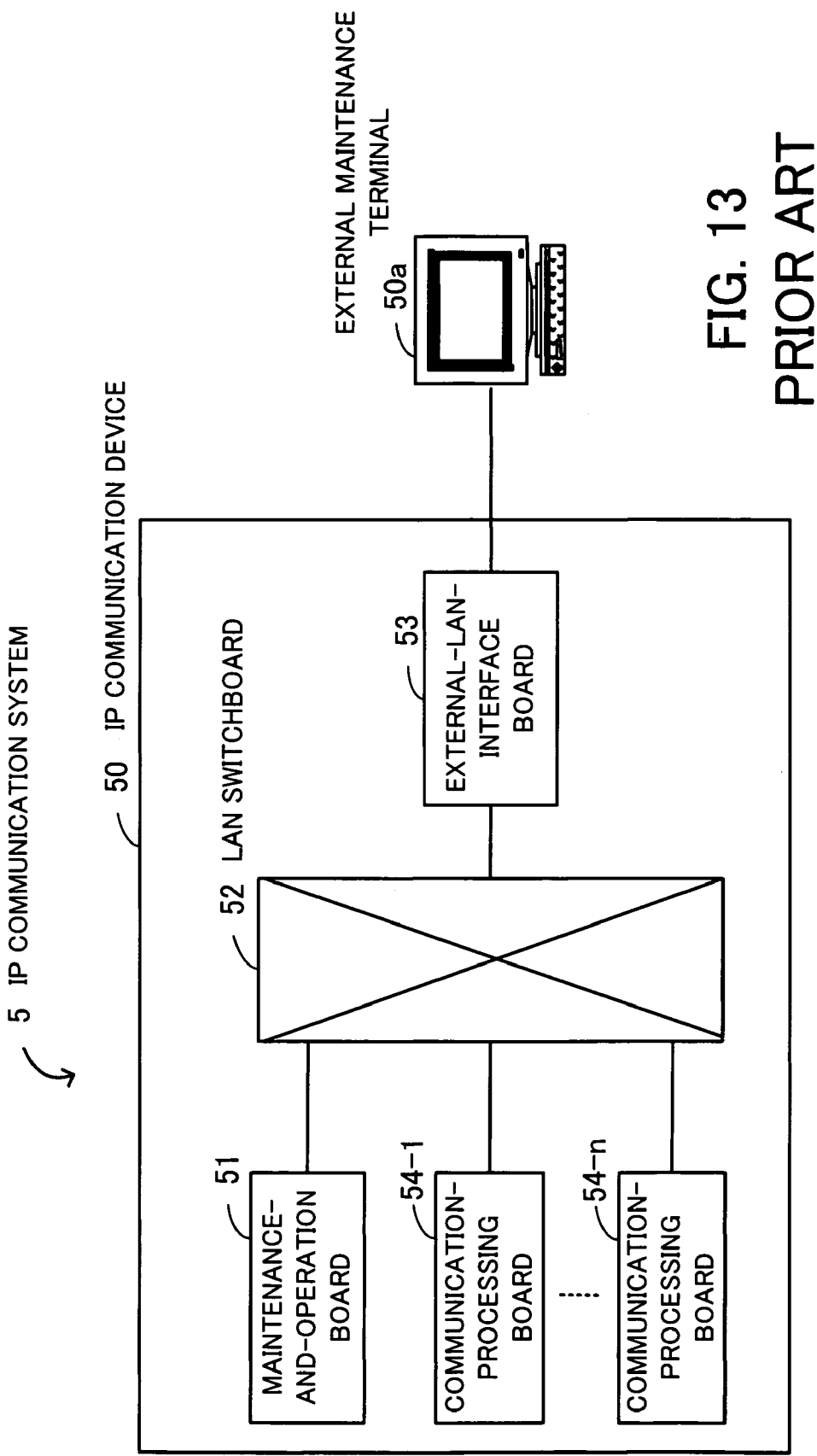
FIG. 13 is a schematic diagram illustrating an outline of a conventional IP communication system.

For comparison, transfer of frames in a conventional communication system is indicated in FIG. 4, which shows examples of transfer of frames between the external maintenance terminal 50a and the maintenance-and-operation board 51 in the conventional communication system of FIG. 13 having the external-LAN-interface board 53. In the communication system indicated in FIG. 4, the external maintenance terminal 50a is connected to the LAN switchboard 52 and the maintenance-and-operation board 51 through the external-LAN-interface board 53, and performs communication with the LAN switchboard 52 and the maintenance-and-operation board 51. In the example of FIG. 4, the global MAC address "G'" and the global IP address "H'" are assigned to the external maintenance terminal 50a, the local MAC address "D'," the local IP address "E'," and the global MAC address "F'" are assigned to the external-LAN-interface LAN-interface board 53, and the local MAC address "A'," the local IP address "B'," and the global IP address "C'" are assigned to the maintenance-and-operation board 51.

Switching Operations

Next, the switching operations performed in the LAN switchboard 12 are explained below with reference to FIGS. 5 and 6.

Figure 5:
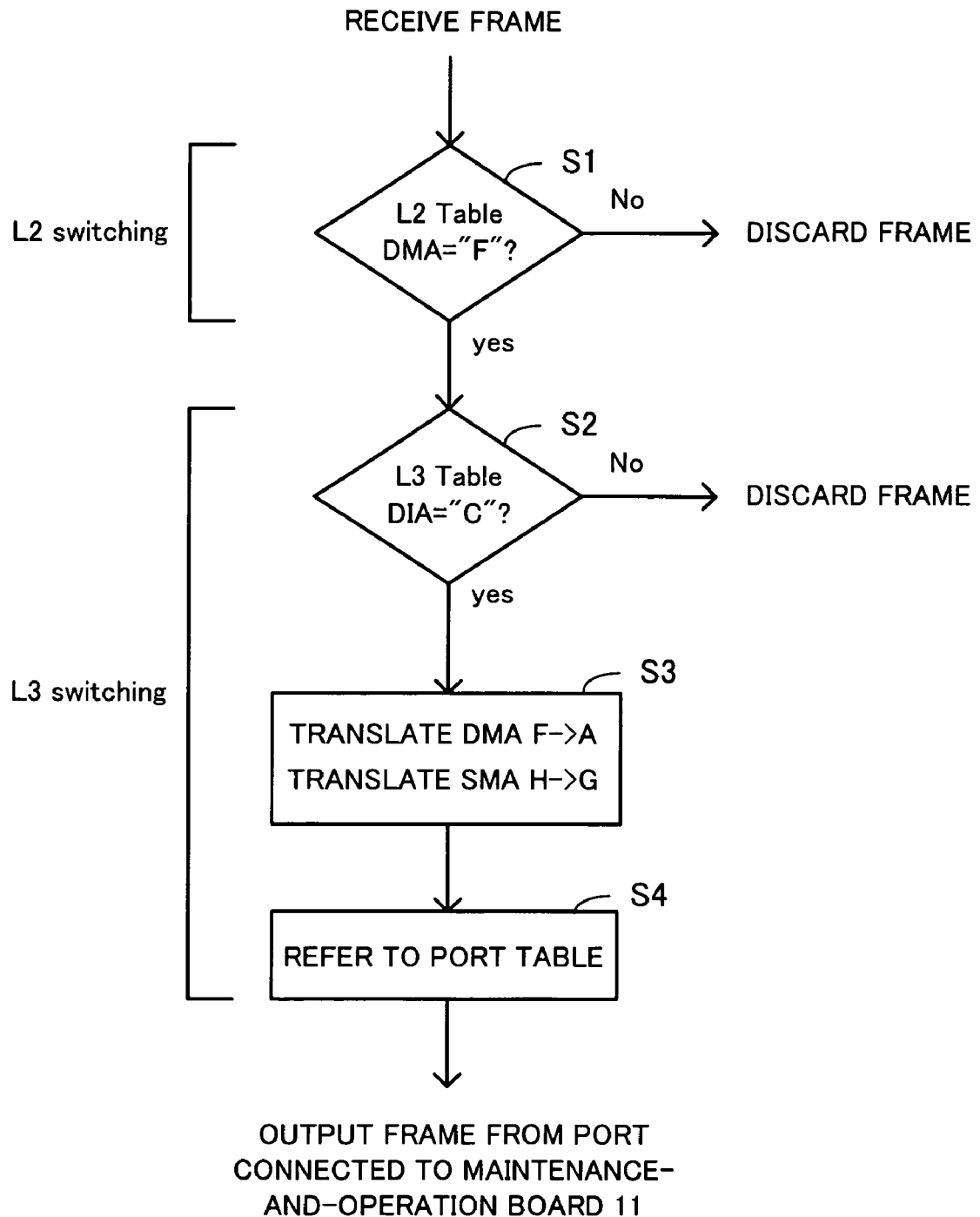
FIG. 5 is a flow diagram illustrating a sequence of operations performed by the switchboard in the IP communication system of FIG. 2 when the switchboard receives a frame from the external maintenance terminal.

FIG. 5 is a flow diagram illustrating a sequence of operations performed by the LAN switchboard 12 in the IP communication system of FIG. 2 when the LAN switchboard 12 receives a frame from the external maintenance terminal 10a as indicated in FIG. 3.

<S1> The LAN switchboard 12 determines whether or not the destination MAC address (DMA) in the received frame is "F" on the basis of the L2 table. When no is determined, the LAN switchboard 12 discards the received frame. When yes is determined, the operation goes to step S2.

<S2> The LAN switchboard 12 determines whether or not the destination IP address (DIA) in the received frame is "C" on the basis of the L3 table. When no is determined, the LAN switchboard 12 discards the received frame. When yes is determined, the operation goes to step S3.

<S3> The LAN switchboard 12 translates the destination MAC address (DMA) "F" into "A," and the source MAC address (SMA) "H" into "G."

<S4> The LAN switchboard 12 refers to a port table, and outputs the frame from a port connected to the maintenance-and-operation board 11.

Figure 6:
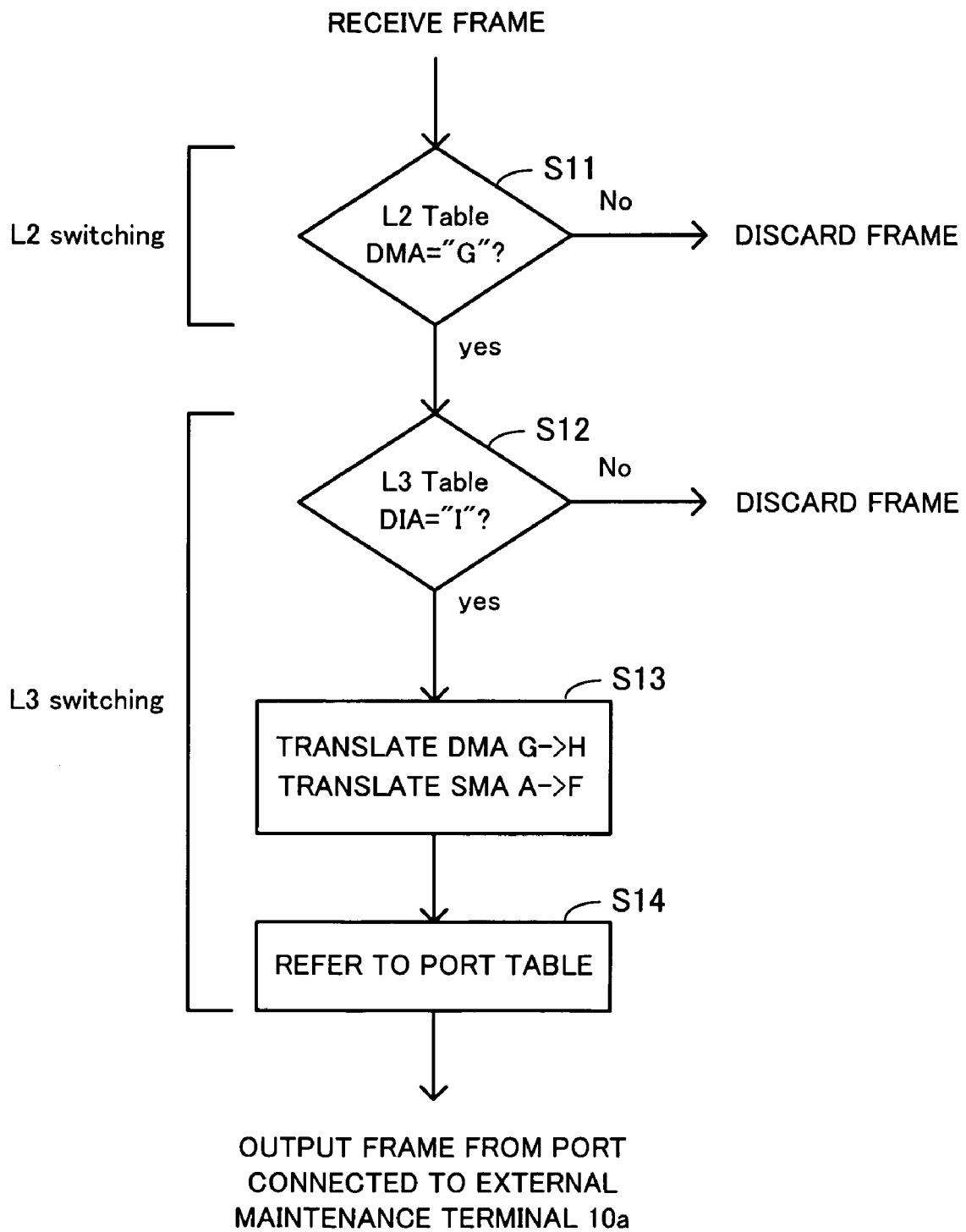
FIG. 6 is a flow diagram illustrating a sequence of operations performed by the switchboard in the IP communication system of FIG. 2 when the switchboard receives a frame from the maintenance-and-operation board.

FIG. 6 is a flow diagram illustrating a sequence of operations performed by the LAN switchboard 12 in the IP communication system of FIG. 2 when the LAN switchboard 12 receives a frame from the maintenance-and-operation board 11 as indicated in FIG. 3.

<S11> The LAN switchboard 12 determines whether or not the destination MAC address (DMA) in the received frame is "G" on the basis of the L2 table. When no is determined, the LAN switchboard 12 discards the received frame. When yes is determined, the operation goes to step S12.

<S12> The LAN switchboard 12 determines whether or not the destination IP address (DIA) in the received frame is "I" on the basis of the L3 table. When no is determined, the LAN switchboard 12 discards the received frame. When yes is determined, the operation goes to step S13.

<S13> The LAN switchboard 12 translates the destination MAC address (DMA) "G" into "H," and the source MAC address (SMA) "A" into "F."

<S14> The LAN switchboard 12 refers to the port table, and outputs the frame from a port connected to the external maintenance terminal 10a. As mentioned before, the L2/L3 tables 12b are set in advance by the CPU 12a in the LAN switchboard 12.

Setting of Address Information

Next, a sequence of operations performed in the IP communication system of FIG. 2 until IP communication is established in the IP communication system 1 is explained below with reference to FIG. 7. In the following explanations, it is assumed that the local MAC address "A" and the local IP address "B" of the maintenance-and-operation board 11, the local MAC address "D," the local IP address "E," and the global MAC address "F" of the LAN switchboard 12, and the global MAC address "H" and the global IP address "I" of the external maintenance terminal 10a are fixedly assigned in advance. Alternatively, the LAN switchboard 12 may be informed of the global MAC address "F" by the address setting unit 14 after initialization of the IP communication device 10 since the local addresses are assigned to the respective boards in the IP communication device 10 as a rule.

<S21> After the system is powered on, the external maintenance terminal 10a and each board in the IP communication device 10 are initialized by hardware and software.

<S22a> The address setting unit 14 sends to the maintenance-and-operation board 11 the global IP address "C" of the maintenance-and-operation board 11.

<S22b> The address setting unit 14 sends to the LAN switchboard 12 the global IP address "M" of the LAN switchboard 12, the global IP address "I" of the external maintenance terminal 10a, and the MAC address "G" as the aforementioned predetermined address for the virtual routing.

<S22c> The maintenance-and-operation board 11 sends the local MAC address "A" to the LAN switchboard 12.

<S23> The CPU 12a in the LAN switchboard 12 stores in a memory the addresses which are sent to the LAN switchboard 12.

<S24> In order to recognize the global MAC address of the external maintenance terminal 10a, the LAN switchboard 12 sends an ARP (address resolution protocol) request to the external maintenance terminal 10a. Then, the external maintenance terminal 10a returns to the LAN switchboard 12 an ARP response containing the global MAC address "H" of the external maintenance terminal 10a, as explained later in detail with reference to FIG. 8.

<S25> The LAN switchboard 12 stores in the memory the global MAC address "H" of the external maintenance terminal 10a which is obtained by the ARP communication.

<S26> The LAN switchboard 12 sets addresses necessary for transfer of a frame from the external maintenance terminal 10a to the maintenance-and-operation board 11. Specifically, the LAN switchboard 12 performs the following operations (a) to (d).

(a) The LAN switchboard 12 sets the global MAC address "F" of the LAN switchboard 12 and a destination port number in the L2 table in correspondence with a switch port connected to the external maintenance terminal 10a.

(b) The LAN switchboard 12 sets the global IP address "C" of the maintenance-and-operation board 11 in the L3 table in correspondence with the switch port connected to the external maintenance terminal 10a.

(c) The LAN switchboard 12 sets the local MAC address "A" of the maintenance-and-operation board 11 in the L3 table in correspondence with the switch port connected to the external maintenance terminal 10a.

(d) The LAN switchboard 12 sets the MAC address "G" for the virtual routing in the L3 table in correspondence with the switch port connected to the external maintenance terminal 10a.

<S27> The LAN switchboard 12 sets addresses necessary for transfer of a frame from the maintenance-and-operation board 11 to the external maintenance terminal 10a. Specifically, the LAN switchboard 12 performs the following operations (e) to (h).

(e) The LAN switchboard 12 sets the MAC address "G" for the virtual routing and a destination port number in the L2 table in correspondence with a switch port connected to the maintenance-and-operation board 11.

(f) The LAN switchboard 12 sets the global IP address "I" of the external maintenance terminal 10a in the L3 table in correspondence with the switch port connected to the maintenance-and-operation board 11.

(g) The LAN switchboard 12 sets the global MAC address "H" of the external maintenance terminal 10a in the L3 table in correspondence with the switch port connected to the maintenance-and-operation board 11.

(h) The LAN switchboard 12 sets the global MAC address "F" of the LAN switchboard 12 in the L3 table in correspondence with the switch port connected to the maintenance-and-operation board 11.

<S28> When address translation and switching are performed in the LAN switchboard 12 on the basis of the settings in step S26 and S27, it is possible to establish IP communication between the maintenance-and-operation board 11 and the external maintenance terminal 10a.

Figure 8:
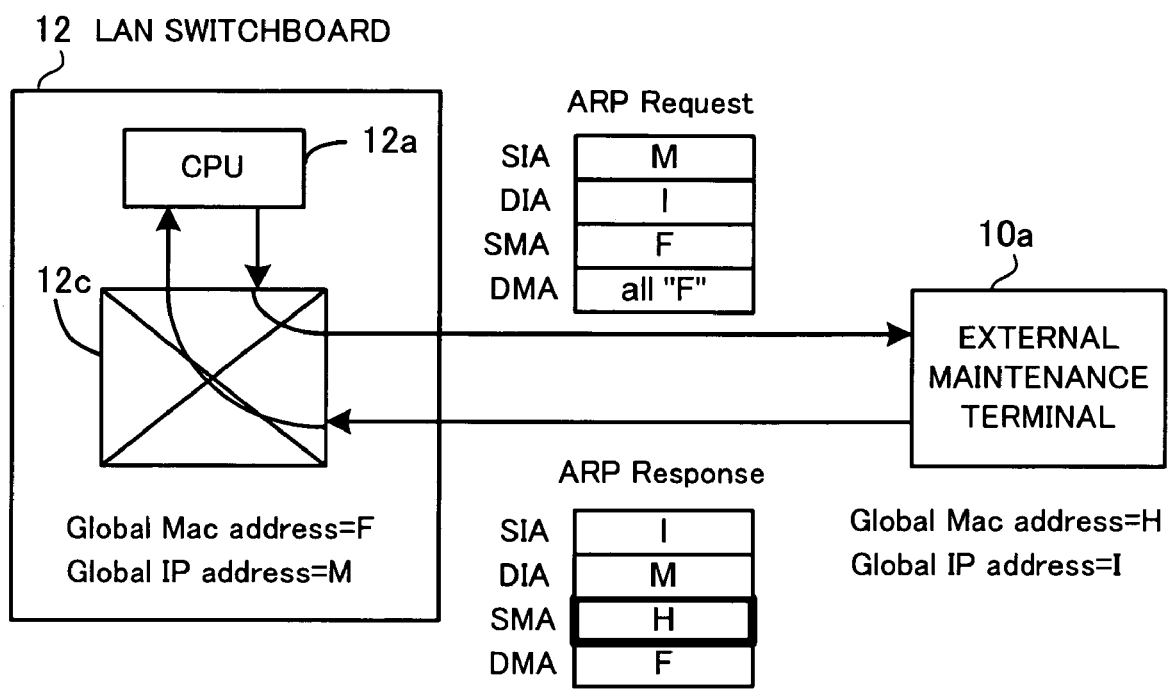
FIG. 8 is a diagram illustrating a sequence of ARP communication.

It is necessary for the IP communication device 10 to acquire the global MAC address "H" of the external maintenance terminal 10a by ARP communication in advance of the IP communication between the maintenance-and-operation board 11 and the external maintenance terminal 10a. FIG. 8 is a diagram illustrating a sequence of the ARP communication.

The LAN switchboard 12 generates an ARP request frame in which the destination MAC address (DMA) is set to all false (all "1"), the global MAC address "F" of the LAN switchboard 12 is set as the source MAC address (SMA), the global IP address "I" of the external maintenance terminal 10a is set as the destination IP address (DIA), and the global IP address "M" of the LAN switchboard 12 is set as the source IP address (SIA). At this time, the external maintenance terminal 10a is already informed of the global IP address "I" of the external maintenance terminal 10a and the global IP address "M" of the LAN switchboard 12.

When the external maintenance terminal 10a receives the ARP request frame, the external maintenance terminal 10a returns to the LAN switchboard 12 an ARP response frame in which the global MAC address "F" of the LAN switchboard 12 is set as the destination MAC address (DMA), the global MAC address "H" of the external maintenance terminal 10a is set as the source MAC address (SMA), the global IP address "M" of the LAN switchboard 12 is set as the destination IP address (DIA), and the global IP address "I" of the external maintenance terminal 10a is set as the source IP address (SIA).

Recovery from Failure

Hereinbelow, operations which are performed for recovery from a failure in software control by the CPU 12a in the LAN switchboard 12 are explained.

When the system is initialized, the CPU 12a in the LAN switchboard 12 is informed of various addresses as mentioned before. After the CPU 12a completes the address setting, communication between the maintenance-and-operation board 11 and the external maintenance terminal 10a is established by hardware switching realized in the switch control unit 12c. In the case considered in the following explanations, it is assumed that a failure in the software control by the CPU 12a in the LAN switchboard 12 occurs after IP communication between the maintenance-and-operation board 11 and the external maintenance terminal 10a is established.

When the CPU 12a newly starts address setting including the virtual routing (i.e., the routing by use of the predetermined address) after occurrence of a failure in the software control by the CPU 12a in the LAN switchboard 12 and subsequent recovery of from the failure, the already established IP communication between the maintenance-and-operation board 11 and the external maintenance terminal 10a is disconnected.

Generally, no problem occurs when the addresses are newly set after the CPU 12a is reset, for example, for the purpose of resetting the objective board by power-on reset or the like. However, if the addresses are reset every time a failure occurs in the software control by the CPU 12a, already established IP communication is disconnected every time such a failure occurs, so that the operability and reliability of communications are lowered.

Therefore, it is necessary to avoid address resetting when a failure occurs in the software control by the CPU 12a in the LAN switchboard 12 after IP communication is established, and the LAN switchboard 12 recovers from the failure.

Figure 9:
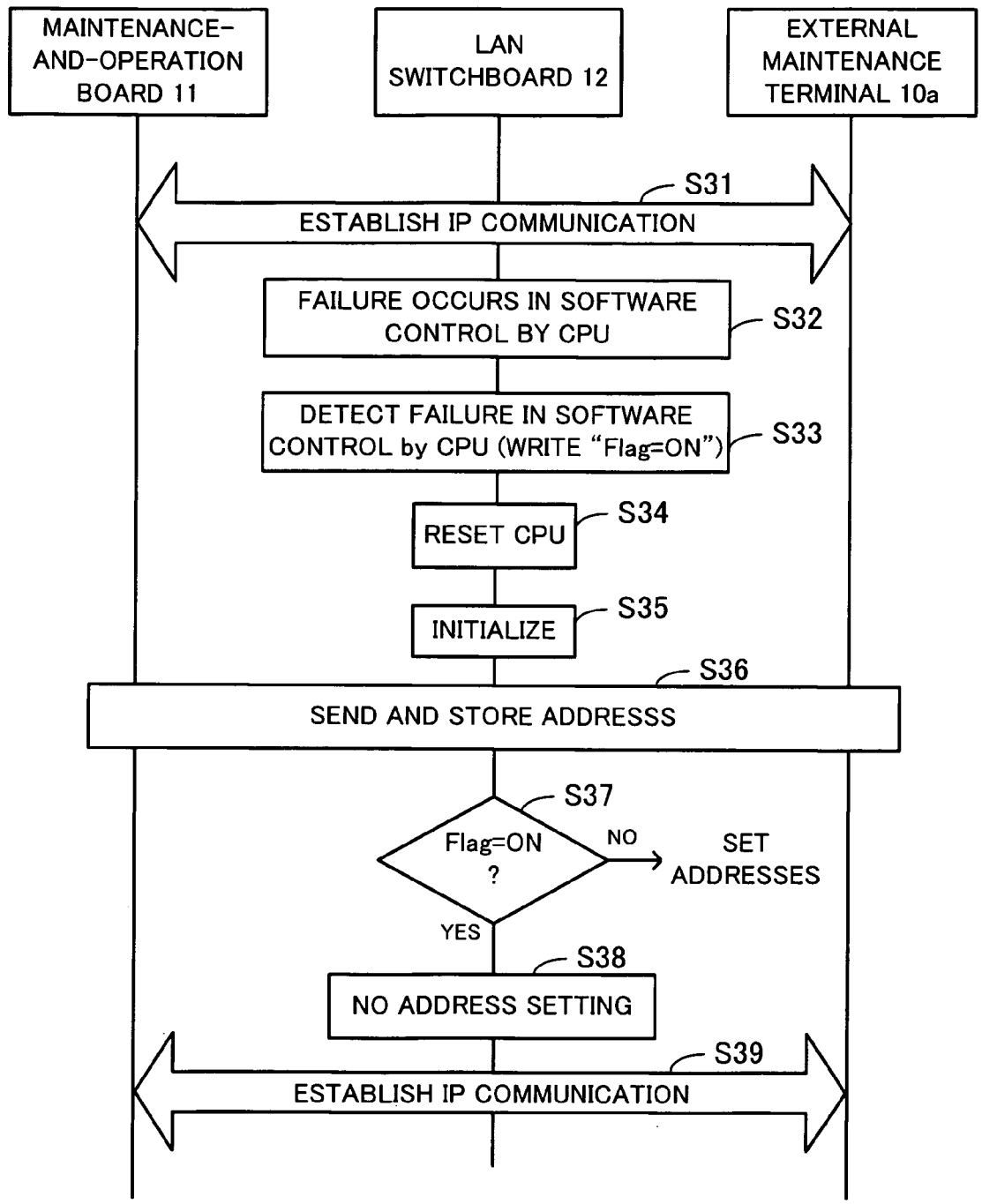
FIG. 9 is a sequence diagram illustrating a sequence of operations performed for recovery from a failure in software control by a CPU.

FIG. 9 is a sequence diagram illustrating a sequence of operations performed for recovery from a failure in the software control by the CPU 12a.

<S31> IP communication is established between the maintenance-and-operation board 11 and the external maintenance terminal 10a.

<S32> The CPU 12a in the LAN switchboard 12 is connected to a memory (which is assumed to be a cache memory in this explanation, fetches instructions from the cache memory, and performs processing. In this explanation, it is assumed that a failure occurs in the software control by the CPU 12a in the above situation.

<S33> The failure detection unit 12d in the LAN switchboard 12 detects the failure in the software control by the CPU 12a, and sets a flag (i.e., writes a value indicating "Flag=ON" in a predetermined memory area in the cache memory which is not cleared even when the CPU 12a is hardware reset. The failure detection unit 12d is a hardware logic circuit for detecting a failure, and can be realized by, for example, a watch dog timer (WDT).

<S34> After the flag is set in step S33, the failure detection unit 12d sends a reset signal to the CPU 12a, and hardware resets the CPU 12a.

<S35> After the CPU 12a is reset in step S34, the CPU 12a performs operations for initialization of the LAN switchboard 12, where the operations for initialization include an operation of reloading a program and data necessary for processing to be performed by the CPU 12a, from a code memory into the cache memory.

Figure 7:
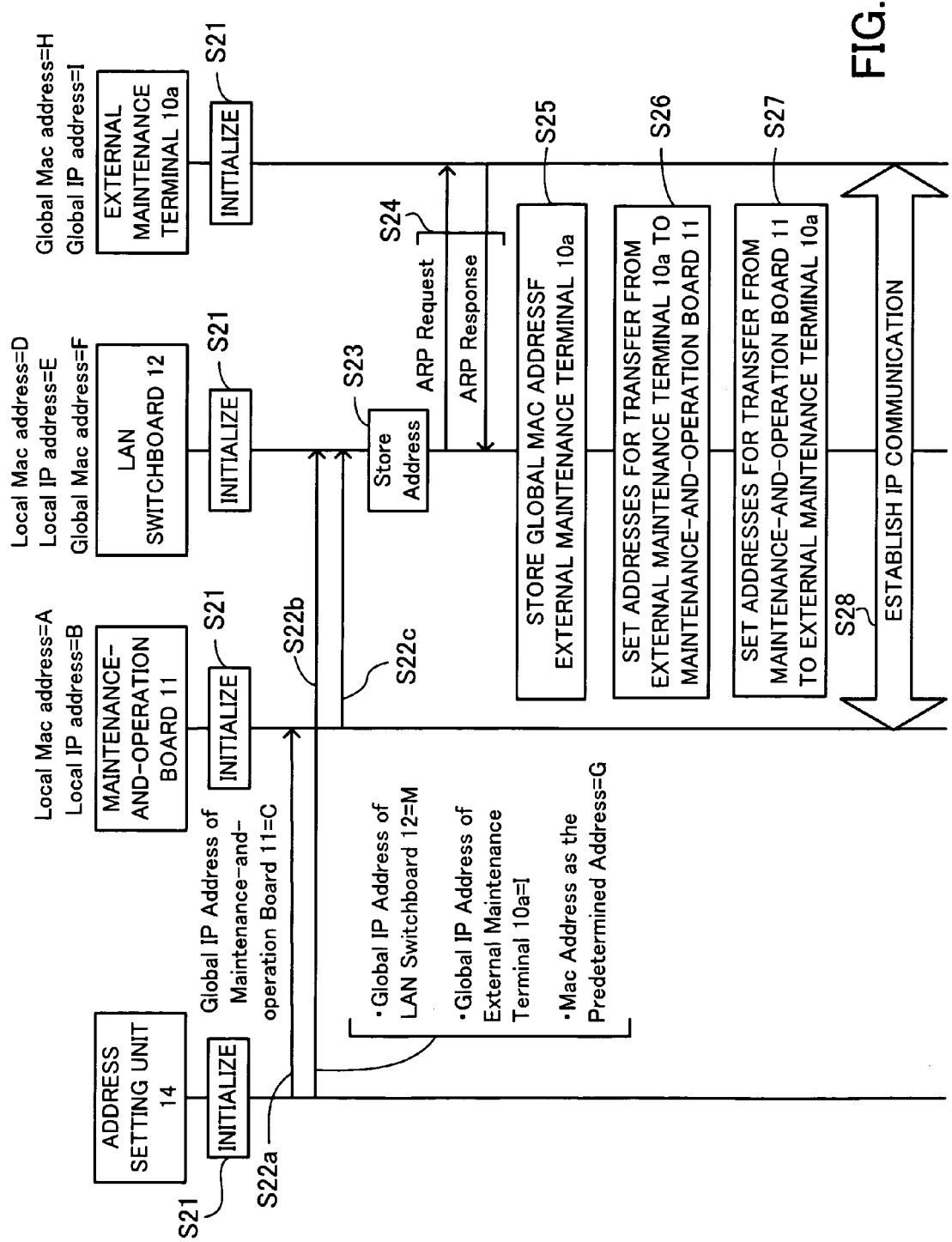
FIG. 7 is a sequence diagram illustrating a sequence of operations performed in the IP communication system of FIG. 2 until IP communication is established.

<S36> Addresses are transferred and stored in similar manners to step S22a to S25 indicated in FIG. 7.

<S37> The CPU 12a in the LAN switchboard 12 accesses the predetermined memory area in the cache memory, and checks the status of the flag. When the status of the flag is "Flag=ON," the CPU 12a recognizes that the CPU 12a has been restarted after occurrence of a failure in the software control. When the status of the flag is "Flag=OFF," the CPU 12a again performs the operations for address setting as indicated in step S26 and S27 in FIG. 7.

<S38> The CPU 12a completes the operation for recovery without setting addresses.

<S39> IP communication is performed between the maintenance-and-operation board 11 and the external maintenance terminal 10a, and is not interrupted even when a failure occurs in software control by the CPU 12a in the LAN switchboard 12 after the IP communication is established.

Advantages of First Embodiment (1) According to the first embodiment of the present invention, no dedicated address-translation board such as the aforementioned external-LAN-interface board 53 (in which address translation is performed under software control of a CPU) is used in IP communication between the maintenance-and-operation board 11 and the external maintenance terminal 10a. Therefore, it is possible to realize massive file transfer and fast collection of log information on system failure, so that maintenance can be quickly performed. In addition, the cost of the system equipment can be suppressed.

(2) In the LAN switchboard 12 in the IP communication system 1 according to the first embodiment, the address setting is realized under software control of the CPU 12a, and the switching operations are performed by hardware in the switch control unit 12c. Therefore, even in the case where massive IP communication is concurrently performed between the external maintenance terminal 10a and each of a plurality of IP communication devices 10, it is unnecessary to consider the software processing performance of the CPU when the system is constructed, and the number of the communication devices which can be connected to the external maintenance terminal 10a is not limited.

(3) It is possible to maintain a connection for IP communication with the external maintenance terminal 10a even in the case where a failure occurs in the software control by the CPU 12a in the LAN switchboard 12 during initialization of the LAN switchboard 12. Therefore, it is possible to determine where the CPU failure occurs, by use of the remote external maintenance terminal 10a.

Second Embodiment

In the IP communication system 1 according to the first embodiment, the maintenance-and-operation board 11 is installed in the same shelf as the switch control unit 12c which is connected to the external maintenance terminal 10a, and the setting in the L2/L3 tables 12b in the LAN switchboard 12 is controlled by the CPU 12a in the LAN switchboard 12.

However, in the case where a large-scale system is constructed, it is unpreferable to restrict the mounting position of the maintenance-and-operation board 11, and it is necessary that the external maintenance terminal 10a and the maintenance-and-operation board 11 can communicate with each other even in the case where the maintenance-and-operation board 11 is installed in a shelf different from a shelf to which the external maintenance terminal 10a is connected.

Figure 10:
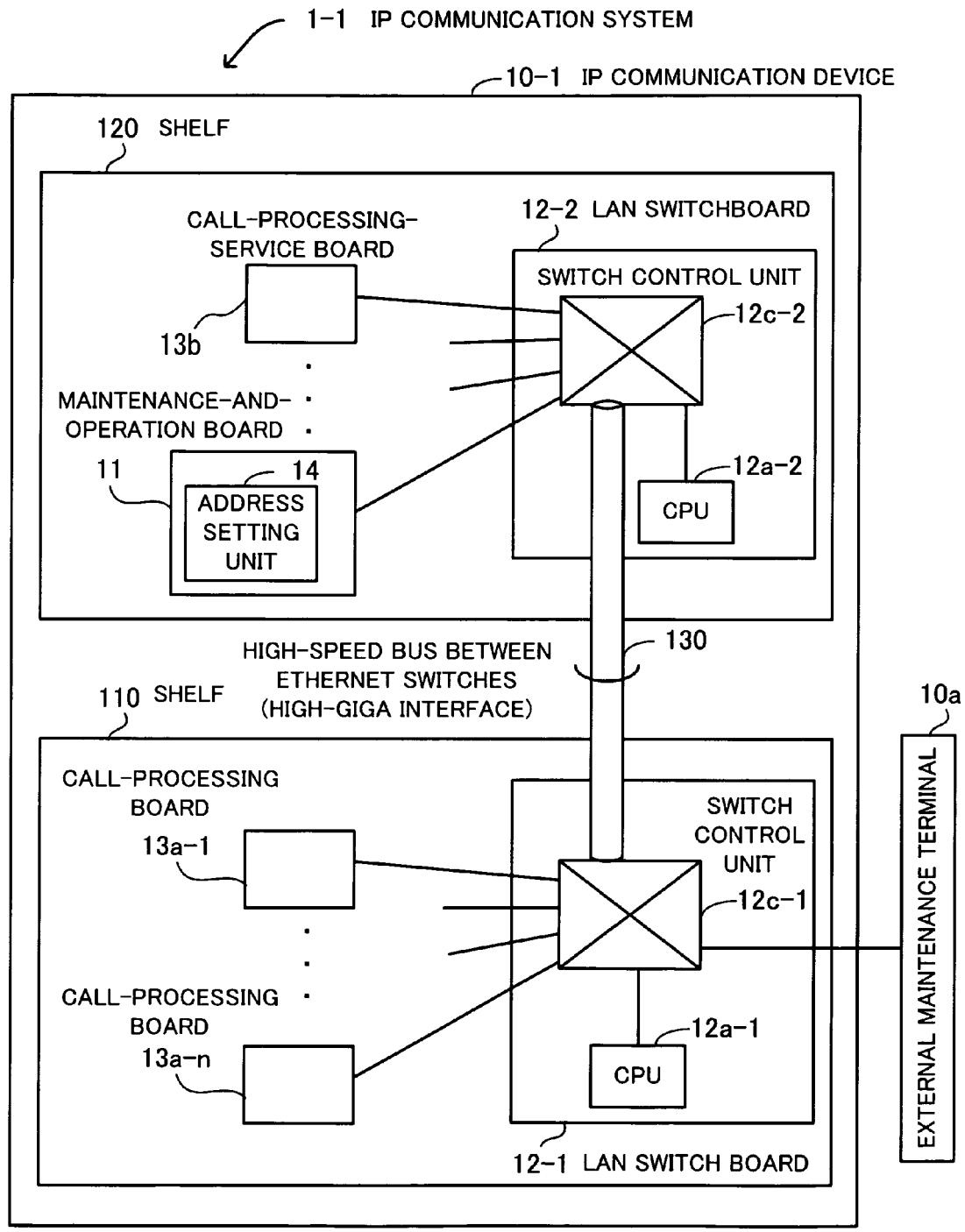
FIG. 10 is a diagram illustrating a configuration of an IP communication system according to a second embodiment of the present invention in which a maintenance-and-operation board is installed in a shelf which is different from a shelf to which an external maintenance terminal is connected.

FIG. 10 is a diagram illustrating a configuration of an IP communication system according to the second embodiment of the present invention, in which the maintenance-and-operation board 11 is installed in a shelf which is different from a shelf to which the external maintenance terminal 10a is connected. The IP communication system 1-1 of FIG. 10 is constituted by an IP communication device 10-1 and the external maintenance terminal 10a, and the IP communication device 10-1 comprises two shelves 110 and 120.

In the shelf 110, a LAN switchboard 12-1 and call-processing boards 13a-1 to 13a-n are installed. The LAN switchboard 12-1 comprises a CPU 12a-1 and a switch control unit 12c-1.

In the shelf 120, a LAN switchboard 12-2, a call-processing-service board 13b, and the maintenance-and-operation board 11 are installed. The LAN switchboard 12-2 comprises a CPU 12a-2 and a switch control unit 12c-2. The maintenance-and-operation board 11 contains the address setting unit 14.

The external maintenance terminal 10a is connected to the LAN switchboard 12-1 in the shelf 110, and the LAN switchboard 12-1 and the LAN switchboard 12-2 in the shelf 120 are connected through a high-speed bus 130 (in accordance with the High-giga Interface) so that the respective boards in the shelves 110 and 120 (including the call-processing-service board 13b and the call-processing boards 13a-1 to 13a-n) logically belong to an identical switch group. Therefore, no additional L2/L3 tables are provided for frames flowing through the high-speed bus 130, and the LAN switchboard 12-1 and the LAN switchboard 12-2 are simply connected through the bus in accordance with the High-giga Interface, which defines a standard format used between switch devices.

As illustrated in FIG. 10, the IP communication system 1-1 according to the second embodiment is functionally superior in that communication with the external maintenance terminal 10a is possible even in the case where the maintenance-and-operation board 11 is installed in the shelf 110 different from the shelf 120 to which the external maintenance terminal 10a is connected. Further, even in the case where the IP communication system contains more than two shelves, it is possible to enable communication with the external maintenance terminal 10a in a similar manner.

Next, setting of address information in the LAN switchboard 12-1 and the LAN switchboard 12-2 is explained below.

In the IP communication system 1 according to the first embodiment illustrated in FIG. 2, the address information for transfer of frames from the external maintenance terminal 10a to the maintenance-and-operation board 11 and from the maintenance-and-operation board 11 to the external maintenance terminal 10a are set in the L2/L3 tables 12b in the single LAN switchboard 12 by the CPU 12a in the LAN switchboard 12. However, in the IP communication system 1-1 according to the second embodiment illustrated in FIG. 10, information for MAC address translation for transfer of frames from the maintenance-and-operation board 11 to the external maintenance terminal 10a is required to be set in the LAN switchboard 12-2 in the shelf 120, where no L2/L3 tables are provided for the High-giga Interface.

Therefore, it is necessary to send the global MAC address of the external maintenance terminal 10a (which is the information for MAC address translation required to be set in the LAN switchboard 12-2 in the shelf 120) through the LAN switchboard 12-1 in the shelf 110 to the LAN switchboard 12-2 in the shelf 120, where the global MAC address of the external maintenance terminal 10a is a dynamic address which is obtained by ARP processing performed by the CPU 12a in the LAN switchboard 12-1 in the shelf 110. Address information including the global MAC address of the external maintenance terminal 10a can be sent to and set in the LAN switchboard 12-2 in different manners.

Figure 11:
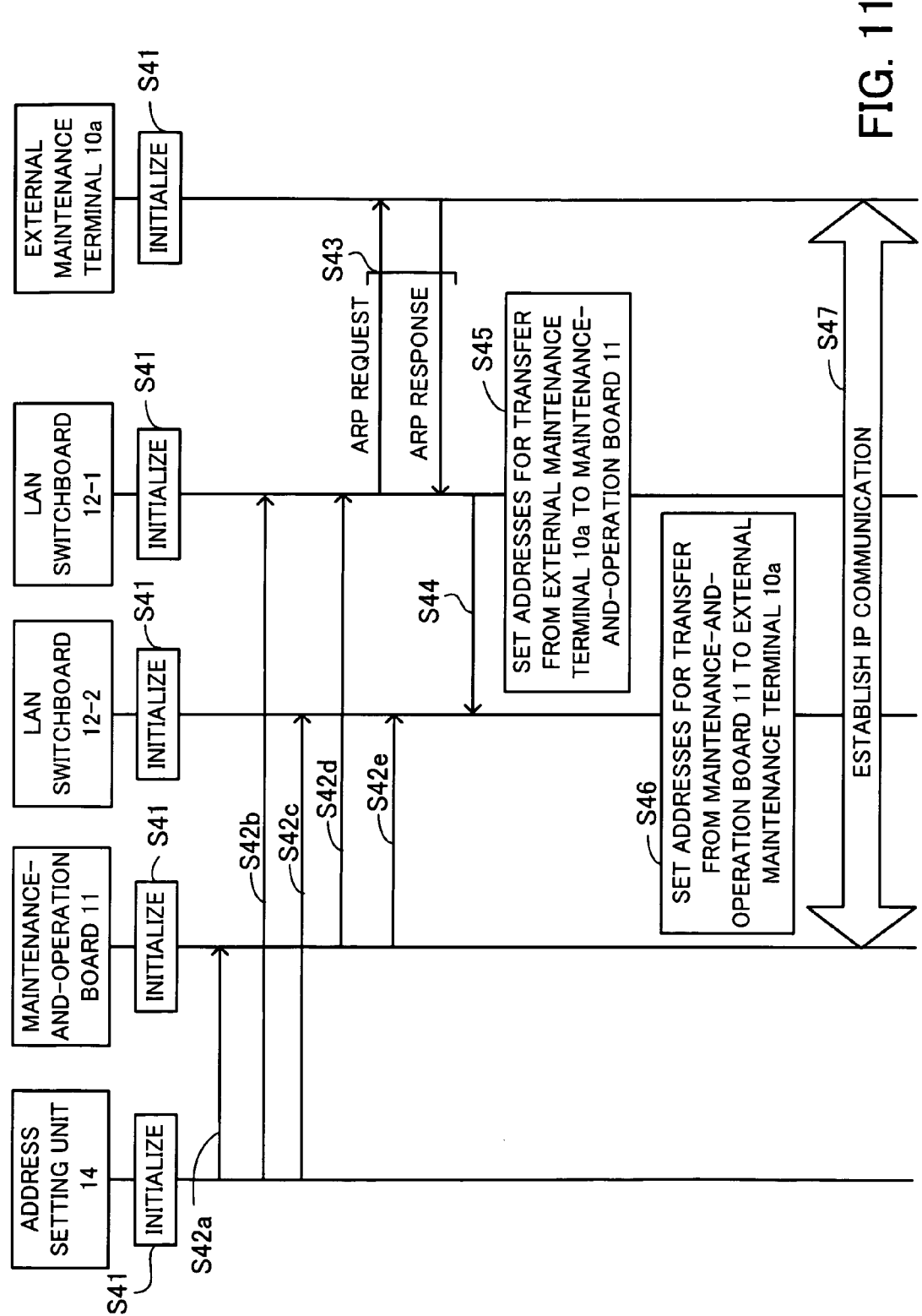
FIG. 11 is a sequence diagram indicating a sequence of operations for setting address information in a first manner in the IP communication system according to the second embodiment.

Hereinbelow, the first manner of sending to and setting in the LAN switchboard 12-2 address information including the global MAC address of the external maintenance terminal 10a is explained with reference to FIG. 11, which is a sequence diagram indicating a sequence of operations for setting address information including the global MAC address of the external maintenance terminal 10a in the IP communication system 1-1 according to the second embodiment in the first manner. In the sequence of FIG. 11, the address information in the LAN switchboard 12-2 is set by board-to-board message communication realized by software.

<S41> After the system is powered on, the external maintenance terminal 10a and each board in the IP communication device 10-1 are initialized by hardware and software.

<S42a> The address setting unit 14 sets in the maintenance-and-operation board 11 the global IP address "C" of the maintenance-and-operation board 11.

<S42b> The address setting unit 14 sends to the LAN switchboard 12-1 the global IP address "M" of the LAN switchboard 12-1, the global IP address "I" of the external maintenance terminal 10a, and the MAC address "G" as the predetermined address for the virtual routing.

<S42c> The address setting unit 14 sends to the LAN switchboard 12-2 the global IP address of the LAN switchboard 12-2, the global IP address of the external maintenance terminal 10a, and the predetermined address "G" for the virtual routing.

<S42d> The maintenance-and-operation board 11 sends the local MAC address of the maintenance-and-operation board 11 to the LAN switchboard 12-1.

<S42e> The maintenance-and-operation board 11 sends the local MAC address of the maintenance-and-operation board 11 to the LAN switchboard 12-2.

<S43> In order to recognize the global MAC address of the external maintenance terminal 10a, the LAN switchboard 12-1 sends an ARP request to the external maintenance terminal 10a, and the external maintenance terminal 10a returns to the LAN switchboard 12-1 an ARP response containing the global MAC address of the external maintenance terminal 10a.

<S44> The CPU 12a-1 in the LAN switchboard 12-1 sends the global MAC address of the external maintenance terminal 10a (obtained in step S43) to the CPU 12a-2 in the LAN switchboard 12-2.

<S45> The LAN switchboard 12-1 sets addresses necessary for transfer of a frame from the external maintenance terminal 10a to the maintenance-and-operation board 11. Specifically, the LAN switchboard 12-1 performs the following operations (a1) to (d1).

(a1) The LAN switchboard 12-1 sets the global MAC address of the LAN switchboard 12-1 and a destination port number in an L2 table in correspondence with a switch port connected to the external maintenance terminal 10a.

(b1) The LAN switchboard 12-1 sets the global IP address of the maintenance-and-operation board 11 in an L3 table in correspondence with the switch port connected to the external maintenance terminal 10a.

(c1) The LAN switchboard 12-1 sets the local MAC address of the maintenance-and-operation board 11 in the L3 table in correspondence with the switch port connected to the external maintenance terminal 10a.

(d1) The LAN switchboard 12-1 sets the MAC address for the virtual routing in the L3 table in correspondence with the switch port connected to the external maintenance terminal 10a.

<S46> The LAN switchboard 12-2 sets addresses necessary for transfer of a frame from the maintenance-and-operation board 11 to the external maintenance terminal 10*a*. Specifically, the LAN switchboard 12-2 performs the following operations (e1) to (h1).

(e1) The LAN switchboard 12-2 sets the MAC address for the virtual routing and a destination port number in an L2 table in correspondence with a switch port connected to the maintenance-and-operation board 11.

(f1) The LAN switchboard 12-2 sets the global IP address of the external maintenance terminal 10*a* in an L3 table in correspondence with the switch port connected to the maintenance-and-operation board 11.

(g1) The LAN switchboard 12-2 sets the global MAC address of the external maintenance terminal 10*a* in the L3 table in correspondence with the switch port connected to the maintenance-and-operation board 11.

(h1) The LAN switchboard 12-2 sets the global MAC address of the LAN switchboard 12-2 in the L3 table in correspondence with the switch port connected to the maintenance-and-operation board 11.

<S47> When address translation and switching are performed in the LAN switchboards 12-1 and 12-2 on the basis of the settings made in step S45 and S46, IP communication between the maintenance-and-operation board 11 and the external maintenance terminal 10*a* can be established.

Next, the second manner of sending to and setting in the LAN switchboard 12-2 address information including the global MAC address of the external maintenance terminal 10*a* is explained below.

According to the first manner of sending and setting the address information to and in the LAN switchboard 12-2, the address information is set in the LAN switchboard 12-2 in the shelf 120 under software control of the CPU 12*a*-2. However, according to the second manner of sending and setting address information to and in the LAN switchboard 12-2, the address information is set in the LAN switchboard 12-2 in the shelf 120 by hardware control without software control by the CPU 12*a*-2 in the LAN switchboard 12-2. Specifically, the CPU 12*a*-1 in the LAN switchboard 12-1 generates a control frame for writing address information in registers in the shelf 120 and sends the control frame to the shelf 120 so that the address information can be set or changed in L2/L3 tables in the LAN switchboard 12-2 in the shelf 120.

Since the CPU 12*a*-2 in the shelf 120 is not required to operate for setting the information for MAC address translation for transfer of frames from the maintenance-and-operation board 11 to the external maintenance terminal 10*a* according to the second manner of sending and setting address information to and in the LAN switchboard 12-2, the CPU 12*a*-1 in the shelf 110 can behave as a master device and also control the LAN switchboard 12-2 in the shelf 120 (or all switchboards in two or more shelves connected to the shelf 110 in the case where the two or more shelves are connected to the LAN switchboard 12-1), where the LAN switchboard 12-2 in the shelf 120 or the switchboards in the two or more shelves are connected to the shelf 110 through an interface unit arranged in the shelf 110. Hereinafter, the interface unit arranged in the shelf 110 is referred to as the high-giga-interface unit.

Figure 12:
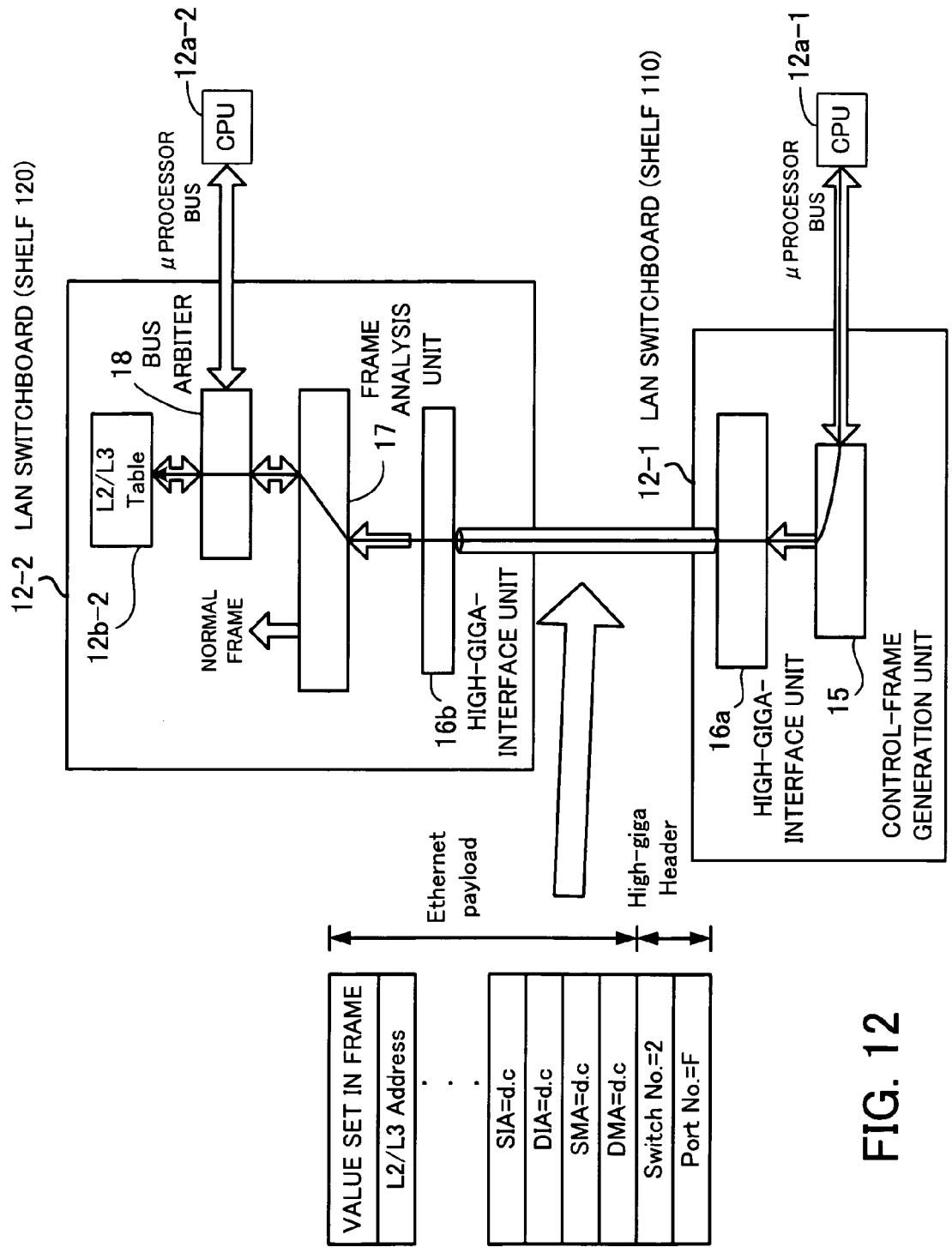
FIG. 12 is a diagram illustrating an arrangement and operations for setting address information in a second manner in the IP communication system according to the second embodiment.

FIG. 12 is a diagram illustrating an arrangement and operations for setting address information in the IP communication system according to the second embodiment in the second manner. In the arrangement of FIG. 12, the LAN switchboard 12-1 in the shelf 110 further contains a control-frame generation unit 15 as well as the aforementioned high-giga-interface unit 16*a*. The control-frame generation unit 15 is connected to the CPU 12*a*-1 through a processor bus, and the high-giga-interface unit 16*a* is connected to another switchboard (e.g., the LAN switchboard 12-2), so that the CPU 12*a*-1 can send a control frame to the switchboard to which the high-giga-interface unit 16*a* is connected.

The operations of sending and setting the address information to and in the LAN switchboard 12-2 in the second manner are explained below.

The operations performed until the ARP communication between the LAN switchboard 12-1 and the external maintenance terminal 10*a* are the same in the first and second manners. After the ARP communication, the CPU 12*a*-1 in the LAN switchboard 12-1 sends to the control-frame generation unit 15 a command to request transmission of a control frame. Then, the control-frame generation unit 15 generates a control frame, and sends the generated control frame through a predetermined port of the high-giga-interface unit 16*a* to the LAN switchboard 12-2. The header of the control frame contains a port number "F" and a switch number "2," where the port number "F" is an identifier indicating that the control frame is sent for setting the L2/L3 tables, and the switch number "2" indicates the LAN switchboard 12-2 as the objective switchboard. In addition, the payload of the control frame contains the global MAC address which the LAN switchboard 12-1 has obtained from the external maintenance terminal 10*a* by the ARP communication, and does not contain the MAC and IP addresses which are sent in the first manner. The operations until the sending of the control frame are performed by software, and the operations after the sending of the control frame are performed by hardware.

When the control frame is sent from the LAN switchboard 12-1 through the high-giga-interface unit 16*a*, the high-giga-interface unit 16*b* in the LAN switchboard 12-2 in the shelf 120 receives the control frame, and transfers the received control frame to a frame analysis unit 17. The frame analysis unit 17 determines, on the basis of the port number in the received control frame, whether the received control frame is a normal Ethernet frame or a control frame for setting the L2/L3 tables. When the port number is "F," the frame analysis unit 17 recognizes that the received control frame is a control frame for setting the L2/L3 tables, and sets the global MAC address of the external maintenance terminal 10*a* contained in the control frame, in the L2/L3 tables 12*b*-2 after arbitration between the access to the L2/L3 tables 12*b*-2 from the frame analysis unit 17 and other access to the L2/L3 tables 12*b*-2 from the CPU 12*a*-2, where the arbitration is performed by a bus arbiter 18.

As explained above, according to the second manner of setting the address information in a switchboard in a shelf other than the shelf to which the external maintenance terminal 10*a* is connected, the setting can be realized without performing communication with the CPU in the other shelf, so that it is unnecessary to care about the condition of the CPU in the other shelf. In addition, since the CPU 12*a*-1 in the shelf 110 can control the address information in the switchboards in all the shelves in a centralized manner, the operations of controlling the address information in the switchboards are easy. Further, in the case where more than one shelf is connected to the shelf 110, the address information can be set in the L2/L3 tables in each of the more than one switchboard (which is connected to the LAN switchboard 12-1 through the high-giga-interface unit 16a) by varying the switch number in the header of the control frame.

ADVANTAGES OF THE INVENTION

In the communication system according to the present invention, when communication is performed between ones of a plurality of boards in a communication device, a switchboard establishes a first connection between the ones of the plurality of boards on the basis of local addresses assigned to the ones of the plurality of boards. In addition, when communication is performed between the maintenance-and-operation board and the external maintenance terminal, the switchboard establishes a second connection between the maintenance-and-operation board and the external maintenance terminal, and translates the global address of the external maintenance terminal into a predetermined address, and the predetermined address into the global address, where the predetermined address is assigned for use only in communication between the maintenance-and-operation board and the external maintenance terminal, and set in the switchboard. Thus, it is unnecessary to provide a dedicated board which performs address translation, so that it is possible to easily connect devices in which different address systems are used, perform communication between such devices, and quickly perform operations for maintenance and control of the communication device.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication system comprising:
an external maintenance terminal to which a global address is assigned, and which externally performs operations for maintenance of a communication device; and
said communication device in which a plurality of boards including a maintenance-and-operation board and a switchboard are installed;
wherein local addresses which are uniquely defined in said communication device are assigned to the plurality of boards, respectively,
said switchboard is directly connected to said external maintenance terminal,
said maintenance-and-operation board performs operations for maintenance and control of the communication device by performing communication with said external maintenance terminal,
a predetermined address is assigned for use only in communication between said maintenance-and-operation board and said external maintenance terminal, and set in said switchboard,
when communication is performed between ones of the plurality of boards, said switchboard establishes a first connection between the ones of said plurality of boards on the basis of ones of said local addresses assigned to the ones of the plurality of boards, and
when communication is performed between the maintenance-and-operation board and the external maintenance terminal, said switchboard establishes a second connection between said maintenance-and-operation board and said external maintenance terminal, and translates said global address into said predetermined address, and the predetermined address into the global address.

2. The communication system according to claim 1, wherein said global address is a global MAC address, and said predetermined address is a predetermined local MAC address.

3. The communication system according to claim 1, wherein said communication device comprises an address setting unit which sends said predetermined address to said switchboard, and first and second global addresses to said maintenance-and-operation board and the switchboard, when the communication device is initialized so that the first global address is set in the maintenance-and-operation board and the predetermined address and the second global address are set in the switchboard, and the predetermined address and the first and second global addresses constitute address information necessary for establishing said second connection.

4. The communication system according to claim 1, wherein said switchboard comprises a central processing unit and a switch control unit, said central processing unit sets address information necessary for establishing said second connection, in said switchboard by software control when said communication device is initialized, and said switch control unit establishes said second connection in the switchboard on the basis of said address information by use of hardware.

5. The communication system according to claim 1, wherein said switchboard comprises a central processing unit, a memory, and a failure detection unit, said failure detection unit detects a failure which can occur in software control during communication between the central processing unit and the memory, sets a flag in a predetermined area in said memory when said failure is detected, and performs a hardware reset of said central processing unit after said flag is set, said predetermined area is not cleared by the hardware reset of said central processing unit, and the central processing unit completes an operation for recovery from the failure without resetting said predetermined address when the central processing unit accesses said predetermined area after said hardware reset and recognizes that said flag is set.

6. The communication system according to claim 1, wherein frames having a header which contains as address information a destination MAC address, a source MAC address, a destination IP address, and a source IP address flow through said switchboard in said communication device when communication is performed between said external maintenance terminal and said maintenance-and-operation board, said external maintenance terminal sets a global MAC address of said switchboard as said destination MAC address, said global MAC address of the external maintenance terminal as said source MAC address, a global IP address of the maintenance-and-operation board as said destination IP address, and a global IP address of the external maintenance terminal as said source IP address in a first frame containing information which is to be sent from the external maintenance terminal to the maintenance-and-operation board, and sends the first frame to the switchboard, and when said switchboard receives said first frame, the switchboard performs address translation, sets a local MAC address of said maintenance-and-operation board as said destination MAC address, said predetermined address as said source MAC address, the global IP address of the maintenance-and-operation board as said destination IP address, and the global IP address of the external maintenance terminal as said source IP address in a second frame containing said information which is to be sent from the external maintenance terminal to the maintenance-and-operation board, and sends the second frame to the maintenance-and-operation board.

7. The communication system according to claim 1, wherein frames having a header which contains as address information a destination MAC address, a source MAC address, a destination IP address, and a source IP address flow through said switchboard in said communication device when communication is performed between said external maintenance terminal and said maintenance-and-operation board, said maintenance-and-operation board sets said predetermined address as said destination MAC address, a global MAC address of the maintenance-and-operation board as said source MAC address, said global IP address of the external maintenance terminal as said destination IP address, and a global IP address of the maintenance-and-operation board as said source IP address in a first frame containing information which is to be sent from the maintenance-and-operation board to the external maintenance terminal, and sends the first frame to the switchboard, and when said switchboard receives said first frame, the switchboard performs address translation, sets said global MAC address of said external maintenance terminal as said destination MAC address, a global MAC address of the switchboard as said source MAC address, a global IP address of the external maintenance terminal as said destination IP address, and the global IP address of the maintenance-and-operation board as said source IP address in a second frame containing said information which is to be sent from the maintenance-and-operation board to the external maintenance terminal, and sends the second frame to the external maintenance terminal.

8. A communication system comprising:
an external maintenance terminal to which a global address is assigned, and which externally performs operations for maintenance of a communication device; and
said communication device having a first shelf in which a plurality of first boards including a first switchboard are installed, a second shelf in which a plurality of second boards including a second switchboard and a maintenance-and-operation board are installed, and a bus connecting said first switchboard and said second switchboard;
wherein local addresses which are uniquely defined in said communication device are assigned to the plurality of first boards and the plurality of second boards, respectively,
said first switchboard is directly connected to said external maintenance terminal,
said maintenance-and-operation board performs operations for maintenance and control of the communication device by performing communication with said external maintenance terminal,
a predetermined address is assigned for use only in communication between said maintenance-and-operation board and said external maintenance terminal, and set in each of the first and second switchboards,
when communication is performed between ones of the plurality of first boards and the plurality of second boards, said first and second switchboards establish a first connection between the ones of the plurality of first boards and the plurality of second boards on the basis of ones of said local addresses assigned to the ones of the plurality of first boards and the plurality of second boards, and
when communication is performed between the maintenance-and-operation board and the external maintenance terminal, said first and second switchboards establish a second connection between said maintenance-and-operation board and said external maintenance terminal, and translate said global address into said predetermined address, and the predetermined address into the global address.

9. The communication system according to claim 8, wherein said first and second switchboards respectively comprise first and second central processing units which control operations of setting address information necessary for establishment of said first and second connections by software, and the first central processing unit sends said global address to the second central processing unit through said bus so that the global address is set in said second switchboard when said communication device is initialized.

10. The communication system according to claim 8, wherein said first switchboard comprises a frame generation unit which generates a control frame containing header information, the header information includes a port number and an identifier of said second switchboard in said second shelf, the port number indicates a port of the second shelf which is connected to said bus, and when the communication device is initialized, the frame generation unit sets said global address of said external maintenance terminal in said control frame, and sends the control frame to said second switchboard on the basis of said header information so that the global address is directly written in a register in the second switchboard without aid of a central processing unit in the second switchboard.

* * * * *